United States Patent Office 3,796,798
Patented Mar. 12, 1974

3,796,798
3-(1-PIPERAZINYLIMINOMETHYL) RIFAMYCIN SV ANTIVIRAL METHODS
Giancarlo Lancini, Pavia, Italy, and Lise Thiry, Brussels, Belgium, assignors to Gruppo Lepetit S.p.A., Milan, Italy
No Drawing. Filed June 1, 1971, Ser. No. 149,086
Claims priority, application Italy, June 1, 1970, 25,381/70
Int. Cl. A61k 27/00
U.S. Cl. 424—180   4 Claims

ABSTRACT OF THE DISCLOSURE

Methods for treating viral-infected animal tissue and animals with an antiviral effective amount of a 3-(1-piperazinyliminomethyl)-substituted rifamycin SV compound corresponding to the formula

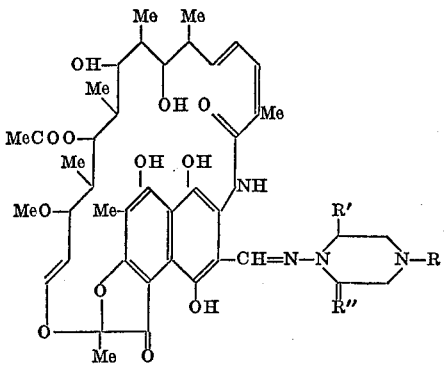

wherein Me represents methyl, R represents H or phenyl-lower alkyl, and each of R' and R" represents H or lower alkyl. The active compounds are prepared by condensing 3-formylrifamycin SV with 1-aminopiperazine or with a 1-aminopiperazine having a 4-phenyl-lower alkyl substituent and/or 2,6-di-lower alkyl substitution.

BACKGROUND OF THE INVENTION

The activity of rifampicin, 3-(4-methyl-1-piperazinyliminomethyl)rifamycin SV, as an antibiotic is well established. In a paper published by E. Heller et al., Nature 222, 273 (1969), it was reported that rifampicin selectively inhibits the replication of vaccina virus.

SUMMARY OF THE INVENTION

This invention concerns methods for treating viral-infected animal tissue and animals with an antiviral effective amount of a 3-(1-piperazinyliminomethyl)-substituted rifamycin SV corresponding to the formula:

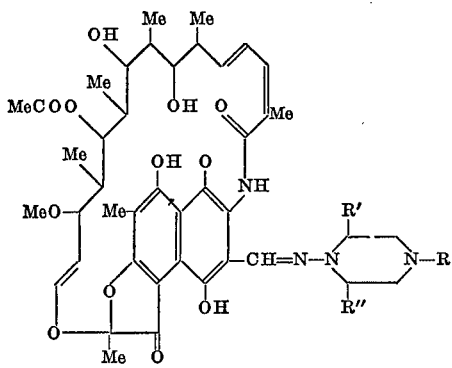

wherein Me represents methyl, R represents H or phenyl-lower alkyl and each of R' and R" represents H or lower alkyl. The term "lower alkyl" is employed in the present specification and claims to designate an alkyl group having from 1 to 4 carbon atoms, e.g., methyl, ethyl, propyl or butyl. The compounds useful in the methods of this invention show a far superior antiviral activity as compared with rifampicin. The compounds are prepared by condensing 3-formylrifamycin SV with a 1-aminopiperazine with the liberation of water, as described in U.S. Pat. 3,342,810.

DESCRIPTION OF PREFERRED EMBODIMENTS

The following nonlimitative examples described representative specific embodiments of the manner and process of making and using, and the best mode contemplated by the inventors for carrying out, their invention.

EXAMPLE 1

3-(1-piperazinyliminomethyl)rifamycin SV 3.75 grams of 3-formylrifamycin SV are dissolved in about 40 ml. of tetrahydrofuran; then 875 mg. of N-aminopiperazine hydrochloride (stoichiometric amount) and 1.48 ml. of triethylamine (about 5 milliequivalents) are added. The mixture is stirred at room temperature for 20 minutes, evaporated to dryness, treated with chloroform (100 ml.) and washed with acidic water (3×100 ml.), to eliminate the triethylamine salt. The mixture is then dried and the organic phase is evaporated to dryness. The crude compound is crystallized from tetrahydrofuran; yield 2 g., M.P. 170° C. (dec.).

Microanalysis: Calculated for $C_{42}H_{56}N_4O_{12}$ wt. percent.—C, 62.36; H, 6.98; N, 6.93. Found: C, 62.06; H, 6.89; N, 6.87.

U.V. and visible spectra significant bands (in methanolic solution buffered to pH 7.38): $\lambda_{max}=335$ m$\mu$; $\lambda_{max}=475$ m$\mu$.

EXAMPLE 2

3-(2,6-dimethyl-4-benzyl-1-piperazinyliminomethyl)rifamycin SV 3 grams of 3-formylrifamycin SV are dissolved in 20 ml. of tetrahydrofuran and 1.2 g. of 1-amino-4-benzyl-2,6-dimethylpiperazine dissolved in 10 ml. of tetrahydrofuran are added with stirring. After 30 minutes the reaction is complete. The solution is concentrated in vacuo to eliminate the solvent and the compound is crystallized from methanol; yield 2.45 g., M.P. 150°–160° C. (dec.).

Microanalysis: Calculated for $C_{51}H_{66}N_4O_{12}$ wt. percent.—C, 66.07; H, 7.18; N, 6.04. Found: C, 65.49; H, 7.39; N, 6.01.

U.V. and visible spectra significant bands (in methanolic solution buffered to pH 7.38): $\lambda_{max}=325$ m$\mu$; $\lambda_{max}=475$–480 m$\mu$.

EXAMPLE 3

3-(4-benzyl-1-piperazinyliminomethyl)rifamycin SV

The compound is prepared pursuant to the procedure of Example 2, substituting 1-amino-4-benzylpiperazine in place of its 2,6-dimethyl analog; yield 95%, M.P. 143°–144° C.

Microanalysis: Calculated for $C_{49}H_{62}N_4O_{12}$ wt. percent.—C, 65.46; H, 6.95; N, 6.23. Found: C, 64.86; H, 7.10; N, 5.99.

U.V. and visible spectra significant bands (in methanolic solution buffered to pH 7.38): $\lambda_{max}=334$ m$\mu$; $\lambda_{max}=470$ m$\mu$.

EXAMPLE 4

3-(4-phenethyl-1-piperazinyliminomethyl)rifamycin SV

The compound is prepared pursuant to the method of Example 2, substituting 1-amino-4-phenethylpiperazine in place of 1-amino-4-benzyl-2,6-dimethylpiperazine; yield 9.2%; M.P. 149° C.

Microanalysis: Calculated for $C_{50}H_{60}N_4O_{12}$ wt. percent.—C, 65.77; H, 7.06; N, 6.14. Found: C, 65.15; H, 7.28; N, 6.24.

U.V. and visible spectra significant bands (in methanolic solution buffered to pH 7.38): $\lambda_{max}=338$ M$\mu$; $\lambda_{max}=480$ m$\mu$.

EXAMPLE 5

3-[4-(3-phenylpropyl)-1-piperazinyl-iminomethyl]rifamycin SV

The compound is prepared pursuant to the method of Example 2, substituting 1-amino-4-(3-phenylpropyl)-piperazine in place of 1-amino-4-benzyl-2,6-dimethyl-piperazine; yield 16.5%; M.P. 174°–175° C.

Microanalysis: Calculated for $C_{51}H_{66}N_4O_{12}$ wt. percent.—C, 66.07; H, 7.17; N, 6.04. Found: C, 65.85; H, 7.31; N, 5.92.

U.V. and visible spectra significant bands (in methanolic solution buffered to pH 7.38).—$\lambda_{max}=334$ m$\mu$; $\lambda_{max}=474$ m$\mu$.

The aminopiperazine starting materials are prepared pursuant to procedures disclosed in U.S. Pat. 2,663,706.

Compositions containing the described active compounds may contain, in addition to the active ingredient, one or more of the usual pharmaceutical excipients, stabilizers, thickening agents, surfactants and solvents such as sugars, cellulose derivatives, starches, polyoxyethylene derivatives, p-hydroxybenzoates, magnesium stearate, sodium metabisulfite, pyrogen-free distilled water, to render them suitable for oral, parenteral or intranasal administration. For intranasal application, suspensions or solutions which may be sprayed into the nasal tissue are advantageously prepared. For oral administration the active ingredients are compounded into tablets or capsules in unitary doses of from 100 mg. to 1 g. For example, a representative tablet may have the following composition:

| | Mg. |
|---|---|
| Active antiviral ingredient | 200 |
| Gelatin | 10 |
| Methylcellulose | 10 |
| Starch | 40 |
| Magnesium stearate | 5 |

A representative solution or suspension suitable for parenteral administration may have the following percent composition:

| | Percent w./v. |
|---|---|
| Active antiviral ingredient | 5.000 |
| Sodium metabisulfite | 1.000 |
| Methyl p-hydroxybenzoate | 0.050 |
| Propyl p-hydraxybenzoate | 0.010 |
| Polyvinyl-pyrrolidone | 10.000 |
| Pyrogen free distilled water q.s. ad | 100.000 |

A representative intranasal spray may have the following composition:

| | | |
|---|---|---|
| Active antiviral ingredient | g | 5 |
| Thimerosal | mg | 2 |
| Methyl p-hydroxybenzoate | mg | 80 |
| Propyl p-hydroxybenzoate | mg | 20 |
| Sodium phosphate | mg | 500 |
| E.D.T.A. disodium salt | mg | 5 |
| Pyrogen free distilled water q.s. ad 100 ml. | | |

The antiviral properties of the compounds and compositions herein disclosed were demonstrated by their plaque formation inhibition in cultures of chick embryo fibroblasts infected with vaccinia or herpetic viruses and cultures of rabbit kidneys infected with herpes simplex virus. Similar other animal-typical viruses such as fowlpox and sheep-pox viruses belong to the vaccinia group while the agent of swine African fever belongs to the herpetic virus group. Their replication is similarly inhibited. Direct effects of the active compounds on plaque formation by the viruses were tested in the following ways.

(a) Under agar.—Virus was absorbed on monolayers or primary cultures of chick embryo fibroblasts; the cellular sheet containing adsorbed virus was then overlaid with agar containing nutrient medium and the drug. After 4 days at 37° C., neutral red was added and the plaques were counted 3 hours layer.

(b) In liquid medium.—The same cells were used and grown in Leighton tubes. After virus adsorption (one PFU, plaque forming unit, per 1 to 3 cells) the cells were washed, 1 ml. of nutrient medium containing the active compound was added; 48 hours later the cells plus fluid were frozen at minus 70° C.; the virus was titrated after rupturing the cells by three freeze-thaw cycles and 30 seconds' treatment with sonic waves. The number of PFU's was determined by counting the plaques as in the method under agar.

(c) Under methylcellulose.—The same method under (a) was applied except that 2 percent methylcellulose was used instead of agar. In the case of herpes simplex virus primary cultures of rabbit kidneys were used.

The results were compared with control cultures. The active compounds generally have low toxicity toward cells, some being non-toxic even at concentrations 5 times greater than the one which produces significant inhibition of viral growth. The toxicity was determined according to the above-described under agar method, excluding infective agent and using the compound concentration which inhibits staining of the cells by neutral red.

A summary of the preceding (a), (b) and (c) test results reported in the following table:

TABLE

Concentration producing a 90% inhibition of the viral growth ($\mu$g./ml.)

| Compound | Vaccinia virus in— | | Herpes in methylcellulose |
|---|---|---|---|
| | Agar | Liquid | |
| (1) | 1–5 | 2–5 | 2–5 |

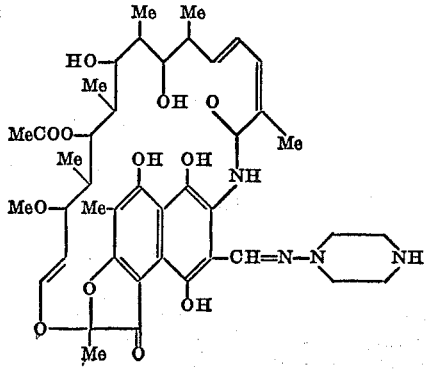

TABLE—Continued

Concentration producing a 90% inhibition of the viral growth (μg./ml.)

| Compound | Vaccinia virus in— | | Herpes in methyl-cellulose |
|---|---|---|---|
| | Agar | Liquid | |
| (2) [structure] | 1-5 | 2-5 | |
| (3) [structure] | | 10 | |
| 3-(4-methyl-1-piperazinyl-iminomethyl)rifamycin SV (rifampicin) | 100 | 50 | >400 |

The active compounds, when tested in viral-infected animals, display a remarkable activity even at doses less than 90 mg./kg. by parenteral route. As an example of a representative operation, preceding Compound 1 was tested intraperitoneally at a dose of 10 mg./kg. in mice infected with vaccinia virus. Lesions of vaccinia were counted on the tails of dosed and control mice eight days after the initial vaccinia injection. The average number of lesions in the treated animals was compared with that of the controls. The compound tested reduced the average number of lesions to 16.5 against 23 with the controls.

The superior antiviral activity of these compounds is confirmed by testing their inhibitory effect against Rous sarcoma virus according to the method of Diggelmann et al., Nature, 224, 1277, 1969. In fact, while concentrations of 30 μg./ml. of rifamycin are required to reduce to about 30 percent the number of focus forming units in cells infected with Rous sarcoma virus, the compounds used in the herein-described methods at concentrations varying from 0.2 to 2 μg./ml. reduce the number of focus forming units to about 15 percent.

The biological activity of the active compounds used herein is accompanied by a low toxicity. The compounds all have $LD_{50}$ values higher than 2000 mg./kg. p.o. and 700 mg./kg. i.p. in mice.

What is claimed is:

1. A method useful for inhibiting the growth of vaccinia viruses which comprises administering to an animal infected with a said virus an antiviral effective amount of a compound of the formula

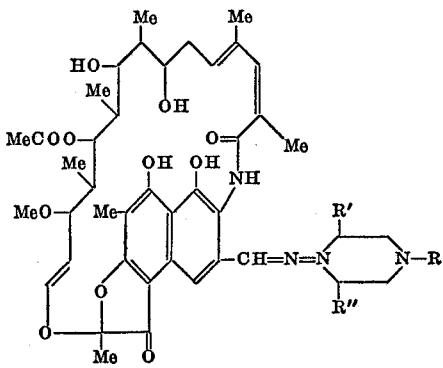

where R is hydrogen or phenyl-lower alkyl and each of R' and R" is hydrogen or lower alkyl.

2. Method of claim 1 wherein the compound is 3-(1-piperazinyliminomethyl)rifamycin SV.

3. Method of claim 1 wherein the compound is 3-(2,6-dimethyl-4-benzyl - 1 - piperazinyliminomethyl)rifamycin SV.

4. A method useful for inhibiting the growth of herpes viruses which comprises administering to an animal infected with a said virus an antiviral effective amount of a compound of the formula
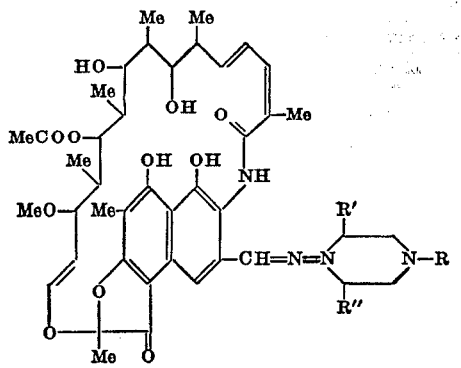
where R is hydrogen or phenyl-lower alkyl and each of R' and R" is hydrogen or lower alkyl.
References Cited
Heller et al., Nature, vol. 222, Apr. 19, 1969, pp. 273–274.
Subak-Sharpe et al., Nature, vol. 222, Apr. 26, 1969, pp. 341–345.
Thiry et al., Nature, vol. 227, Sept. 5, 1970, pp. 1048–1050.
Lawcini et al., J. of Antibiotics, vol. 24, No. 1, January 1971, pps. 64–66.

UNITED STATES PATENT OFFICE
CERTIFICATE OF CORRECTION

Patent No. 3,796,798          Dated  March 12, 1974

Inventor(s)  Giancarlo Lancini and Lise Thiry

It is certified that error appears in the above-identified patent and that said Letters Patent are hereby corrected as shown below:

Column 1, lines 55-70, the formula should appear as follows:

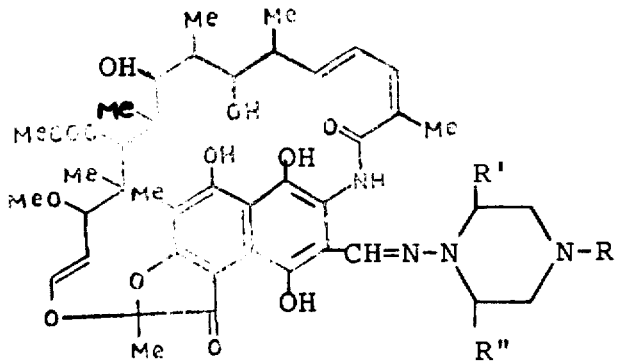

Column 3, line 52, correct spelling of "p-hydroxybenzoate";

Column 4, line 29, change "layer" to -- later --;

Column 5, line 63, change "rifamycin" to -- rifampicin --;

Signed and sealed this 5th day of November 1974.

(SEAL)
Attest:

McCOY M. GIBSON JR.          C. MARSHALL DANN
Attesting Officer             Commissioner of Patents